(12) United States Patent
Osborne

(10) Patent No.: US 6,694,716 B1
(45) Date of Patent: Feb. 24, 2004

(54) MOWING MACHINE CHUTE CLEANER APPARATUS AND METHOD

(75) Inventor: Christopher M. Osborne, Hillsborough, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/208,888

(22) Filed: Jul. 30, 2002

(51) Int. Cl.[7] .............................................. A01D 43/06
(52) U.S. Cl. ....................................................... 56/202
(58) Field of Search ........................ 56/194, 202, 320.2, 56/320.1, 1, 16.4 R, DIG. 20, DIG. 24

(56) References Cited

U.S. PATENT DOCUMENTS

| | | | |
|---|---|---|---|
| 2,067,916 A | * | 1/1937 | Haffner et al. ................. 56/199 |
| 2,517,335 A | * | 8/1950 | Muzzy .......................... 56/199 |
| 3,423,918 A | | 1/1969 | Siwek |
| 3,636,686 A | | 1/1972 | Meyer et al. |
| 3,827,220 A | | 8/1974 | Seidel |
| 3,872,656 A | | 3/1975 | Dahl |
| 3,893,284 A | * | 7/1975 | Thon et al. .................... 56/202 |
| 3,949,540 A | | 4/1976 | Christopherson et al. |
| 4,043,102 A | * | 8/1977 | Uhlinger et al. ............. 56/17.4 |
| 4,203,276 A | | 5/1980 | Plamper |
| 4,238,918 A | * | 12/1980 | Saruhashi et al. .......... 114/116 |
| 4,326,370 A | * | 4/1982 | Thorud ......................... 56/202 |
| 4,637,203 A | | 1/1987 | Fedeli |
| 4,726,177 A | * | 2/1988 | McGoughy ................... 56/202 |
| 5,076,045 A | * | 12/1991 | McClung, IV ............... 56/202 |
| 6,050,072 A | | 4/2000 | Chabrier et al. |
| 6,490,851 B2 | * | 12/2002 | Kutsukake ................. 56/320.1 |

* cited by examiner

Primary Examiner—Thomas B. Will
Assistant Examiner—Alicia Torres
(74) Attorney, Agent, or Firm—Jenkins, Wilson & Taylor, P.A.

(57) ABSTRACT

A mowing machine chute cleaner apparatus and method including a housing and at least one rotatable blade positioned at least partially within the housing for cutting grass. The mowing machine includes a discharge chute for discharge of cut grass, wherein the discharge chute defining an exit opening, and the mowing machine includes a cover flap attached to the grass mowing machine and being movable from a closed position covering the discharge chute exit opening to an open position wherein the discharge chute exit opening is uncovered by the cover flap. The mowing machine also includes a movable clearing flap attached to the grass mowing machine which can be moved in a clearing motion through at least a portion of the discharge chute by movement of the cover flap to at least partially clear cut grass from the discharge chute.

5 Claims, 2 Drawing Sheets

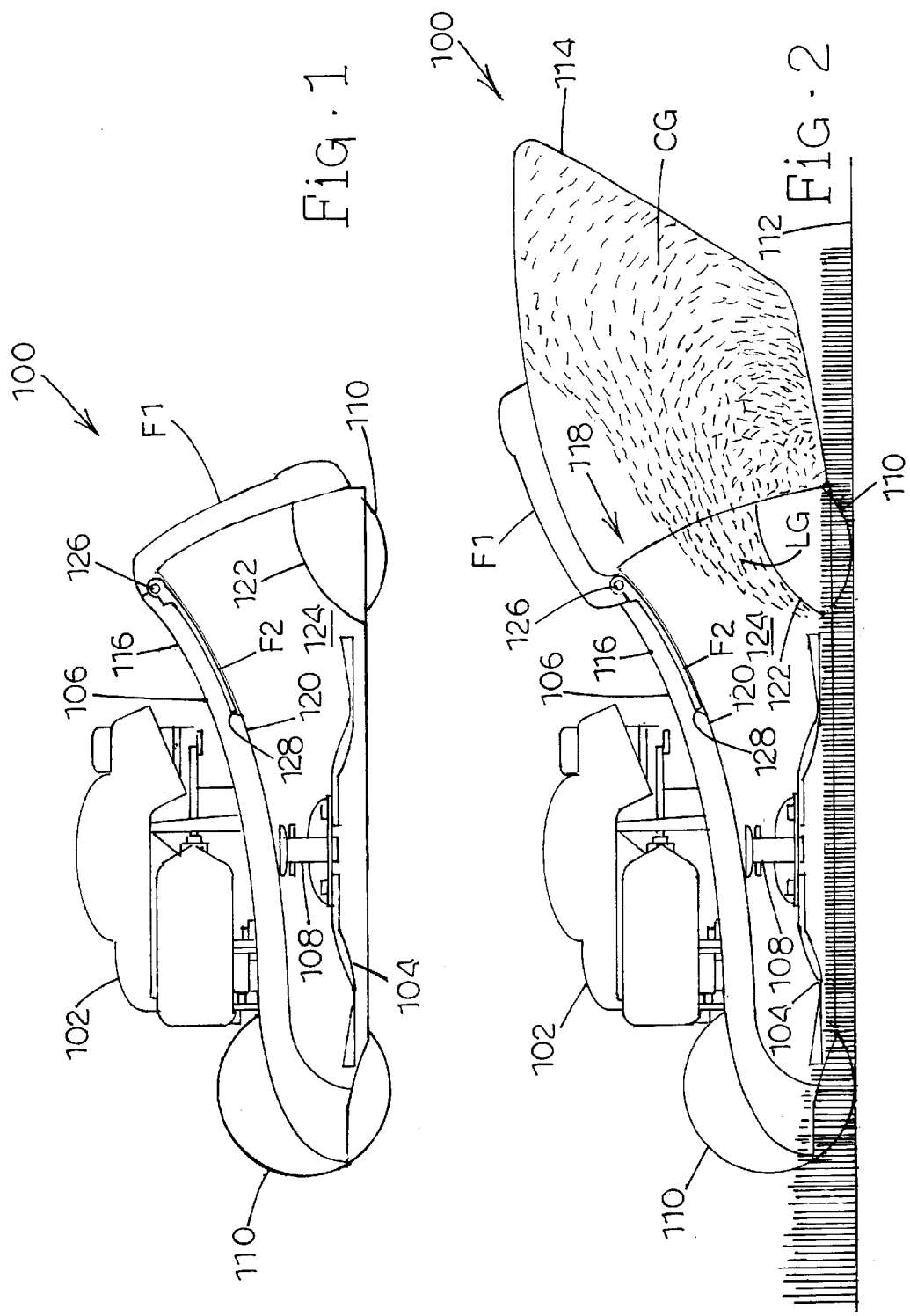

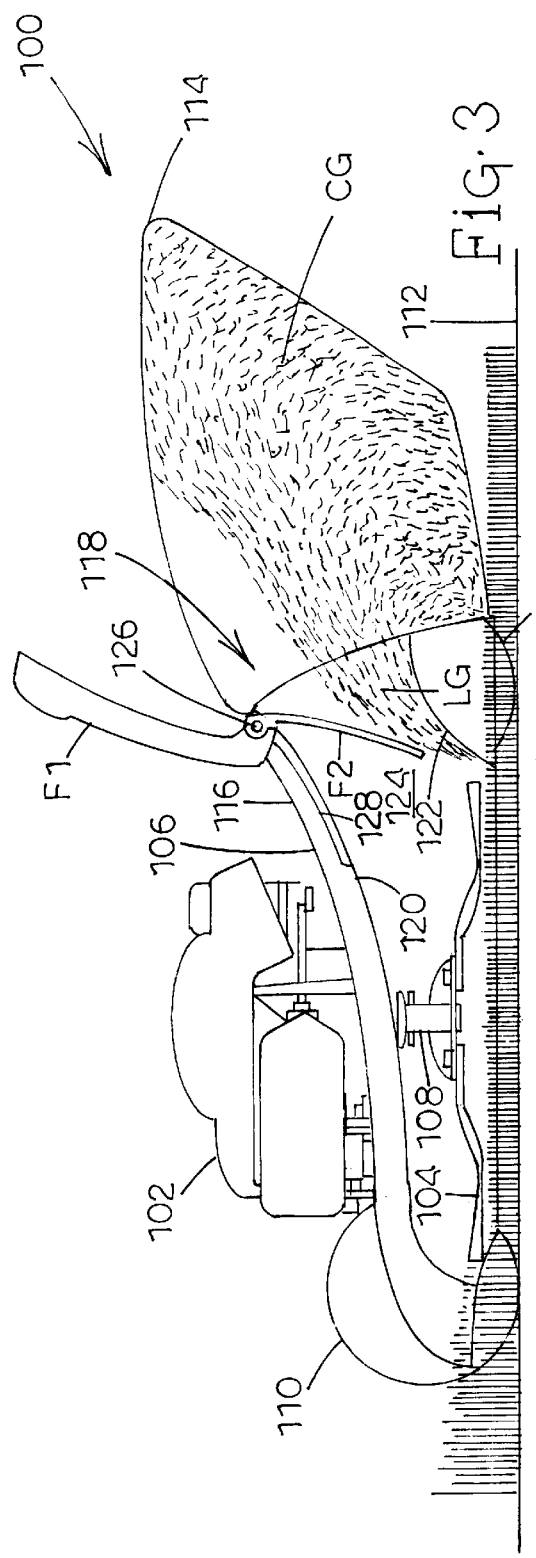
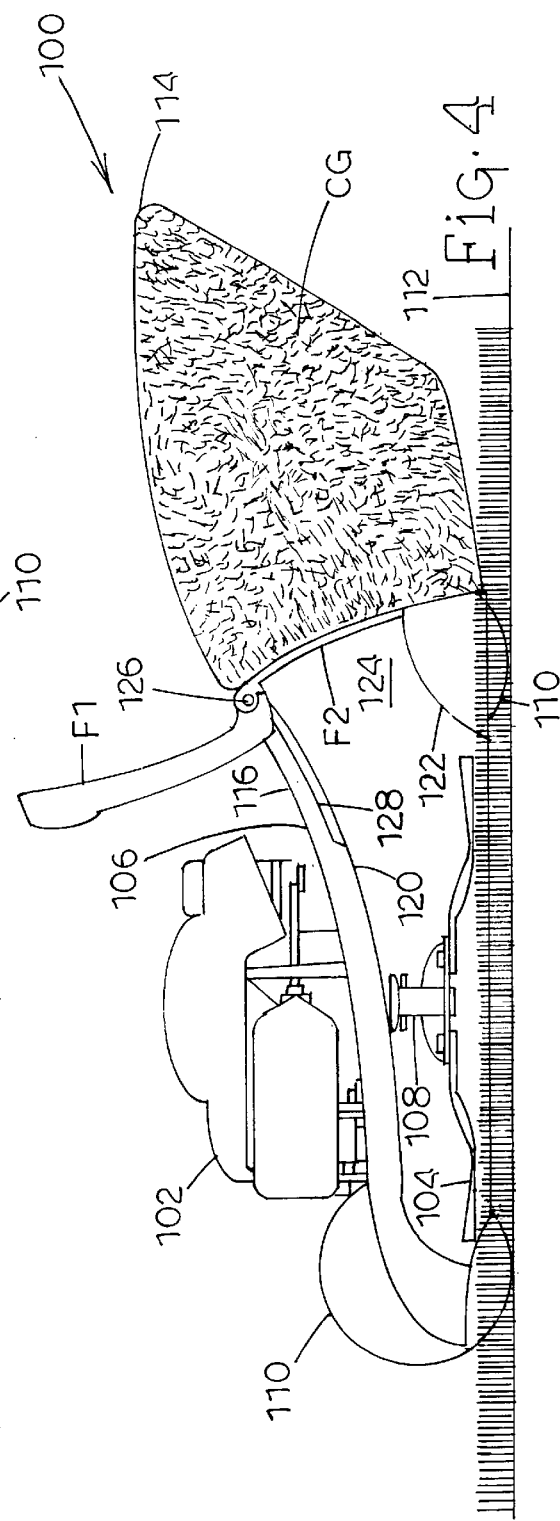

MOWING MACHINE CHUTE CLEANER APPARATUS AND METHOD

TECHNICAL FIELD

The present invention generally relates to the field of grass mowing machines and methods. More particularly, the present invention relates to grass discharge from grass mowing machines.

BACKGROUND ART

Grass mowing machines typically include an engine with a drive assembly for rotating one or more grass cutting blades about an axis substantially perpendicular to the ground. The engine can be operatively attached to a wheel assembly for causing the grass mowing machine to advance. Grass mowing machines also typically include a housing providing structural support and housing one or more cutting blades to protect the operator and nearby objects from contacting the cutting blades and to prevent the cutting blades from projecting cut grass or other debris in undesired directions.

Furthermore, many grass mowing machines include an attachable grass collection bag for receiving and storing cut grass and other lawn debris, such as leaves. Mowing machines having a grass collection bag include a housing having a chute, or "wind tunnel", that provides a passage for cut grass to move from inside the housing into a collection bag. Cut grass can be delivered to the collection bag via the air flow generated by the rapidly rotating cutting blade. When a collection bag becomes full of cut grass, an operator typically can manually release the collection bag from the housing and empty the bag. A movable cover mechanism such as a flap is often utilized which is closed when the collection bag is unattached and open when the collection bag is attached to the grass mowing machine.

One problem with existing grass mowing machines is that a portion of the cut grass tends to remain in the housing chute when a full or partially full collection bag is wholly or partially removed for emptying. Remaining cut grass is an undesirable condition because it can then spill out onto the lawn after removal of the collection bag.

A variety of apparatuses and methods have been developed to handle the removal and placement of cut grass into a grass collection bag. U.S. Pat. No. 3,827,220 to Seidel discloses a safety cover guard for the grass discharging orifice of a rotary lawnmower. The rotary lawnmower is provided with a removable grasscatcher having a protruding lip for gathering cuttings close to the blade cutting circle. The cover guard has a lower pivoted flap to enable the protruding lip to enter the orifice while the cover guard is in position. The rotary lawnmower further includes a means operable while the grasscatcher is attached for removing the cover guard from the orifice and a resilient means for restoring the flap when the protruding lip of the grasscatcher is withdrawn.

U.S. Pat. No. 3,949,540 to Christopherson discloses an arrangement, for a lawn mower having a closable discharge passage, which comprises a bag, and a means for mounting the bag on the housing and handle of the mower with a portion of the mouth of the bag in apposition with the discharge passage. The arrangement further includes an interlock means for preventing the opening of the discharge passage unless the bag is mounted on the housing and a means for opening the full mouth of the bag, to empty mowed grass therefrom, and for automatically acting, when the bag is remounted on the mower, to close that portion of the mouth which extends beyond the discharge passage.

U.S. Pat. No. 4,203,276 to Plamper discloses a mower and grass collector. The mower has a closure over its discharge port for opening and closing the port in accordance with the mounting of the grass collector on the mower housing. The closure is spring-biased to a closed position and swingable forwardly and downwardly in the housing by an operating means carried by the collector and intrudable into the housing through the port to press open the closure upon mounting of the collector on the mower housing.

U.S. Pat. No. 4,637,203 to Fedeli discloses a mowing machine comprising at least a grass cutting blade, rotating about an axis substantially perpendicular to the ground and housed within a casing. The casing is open at the bottom and communicates with a cut grass conveying duct for discharging the cut grass. The conveying duct includes a movable wall at the bottom that is tiltable towards the inlet mouth of a cut grass collecting vessel. The collecting vessel is associated with the cut grass discharging mouth of the conveying duct.

U.S. Pat. No. 6,050,072 to Chabrier et al. discloses a riding mower including a cutting device which moves cut grass through a rearwardly extending connection conduit into a rear collector for cut grass. For emptying, the collector is pivotally mountable and adapted to be detached from the connection conduit. A movable flap is disposed in the region of the connection conduit and in one embodiment is mounted on the collector. Upon disengagement of the collector from the connection conduit and pivoting the collector, the flap can be moved into a position closing the collector.

Despite the existence of apparatuses and methods relating to removal of cut grass from grass mowing machines, it is desirable to provide a novel apparatus and method for conveniently clearing cut grass from a discharge chute of a grass mowing machine upon removal or opening of a grass collector attached to the mowing machine.

DISCLOSURE OF THE INVENTION

A grass mowing machine is provided having a housing and at least one rotatable blade positioned at least partially within the housing for cutting grass. The mowing machine includes a discharge chute defining an exit opening for discharge of cut grass. The mowing machine further includes a cover flap attached to the grass mowing machine and being movable from a closed position covering the discharge chute exit opening to an open position wherein the discharge chute exit opening is uncovered by the cover flap. The mowing machine also includes a movable clearing flap attached to the grass mowing machine for moving in a clearing motion through at least a portion of the discharge chute to at least partially clear cut grass from the discharge chute. The clearing flap and the cover flap are operative such that the cover flap can be moved while in its open position to cause the clearing flap to move in its clearing motion.

A removable grass collector can be attached to the mowing machine for collecting cut grass discharged from the discharge chute. When the grass collector is attached to the grass mowing machine, the cover flap can be positioned in its open position with the grass collector covering the discharge chute. When the grass collector is full or partially full of cut grass, the coverflap can be moved to cause the clearing flap to move in its clearing motion to at least partially clear cut grass from the discharge chute and into the grass collector.

It is therefore an object to provide a novel apparatus and method for conveniently clearing cut grass from a discharge chute of a grass mowing machine upon removal or opening of a grass collector attached to the mowing machine.

An object of the invention having been stated hereinabove, other objects will become evident as the description proceeds when taken in connection with the accompanying drawings as best described hereinbelow.

BRIEF DESCRIPTION OF THE DRAWINGS

Exemplary embodiments of the invention will now be explained with reference to the accompanying drawings, of which:

FIG. 1 is a schematic cross-sectional view of a grass mowing machine;

FIG. 2 is a schematic cross-sectional view of a grass mowing machine configured for mowing a lawn and collecting the cut grass in a grass collector; and FIGS. 3 and 4 are schematic cross-sectional views of a grass mowing machine configured for clearing grass from inside the grass mowing machine.

DETAILED DESCRIPTION OF THE INVENTION

Referring to FIGS. 1–4, schematic cross-sectional views of a grass mowing machine, generally designated 100, according to an embodiment of the present invention are illustrated. Referring specifically to FIG. 1, grass mowing machine 100 includes an engine 102, a rotatable blade 104, and a housing 106. Engine 102 is mounted on housing 106 and attached to rotatable blade 104 via a suitable drive shaft 108 for spinning rotatable blade 104 in a horizontal plane for cutting grass. Rotatable blade 104 is partially surrounded by and positioned beneath housing 106, which at least serves to protect an operator from accidentally contacting blade 104 and prevent cut grass and other debris from being projected in undesired directions due to contact with spinning blade 104. Machine 100 further includes wheels 110, which can be free-rolling, to facilitate movement of machine 100 by an operator along surface 112. Blade 104 is displaced above and parallel with a lawn surface 112 (FIGS. 2–4) for evenly cutting grass on a lawn. Alternatively, wheels 110 can be driven by engine 102 through a suitable drive train. Machine 100 further typically includes a handle (not shown) attached to housing for facilitating operator movement of machine 100.

A grass collector of any suitable shape and construction, shown in FIGS. 2–4 as a collection bag 114, can be releasably attached to housing 106 for receiving and storing grass cut by blade 104. As described in further detail hereinbelow, bag 114 can be manually removed by an operator for emptying. Housing 106 includes a discharge chute 116 with an opening, generally designated 118 (FIG. 1), for passage or discharge of cut grass from inside of housing 106 and discharge chute 116 into bag 114. Chute 116 is preferably positioned on a lateral or rear side of the housing 106 and preferably includes an upper surface 120, a lower surface 122, and opposing side portions (only one shown as side portion 124) inside housing 106 forming a path for passage of cut grass into bag 114. Referring to FIGS. 2 and 3, bag 114 is shown in a near-full condition wherein a portion of loose cut grass LG is positioned outside of bag 114 on lower surface 122 of chute 116.

Machine 100 includes a cover flap F1 preferably pivotally attached to the top of discharge chute 116 at exit opening 118 via a rod or pin 126. Referring to FIG. 1, machine 100 is shown in a mode of operation without bag 114 attached. In this mode, cover flap F1 is positioned in a closed position covering opening 118 to block discharge of cut grass from chute 116 of housing 106. Cover flap F1 can be biased in the closed position by a suitable spring mechanism. Alternatively, cover flap F1 can be maintained in the closed position by another suitable mechanism or structure known to those of skill in the art. As shown in FIG. 2, cover flap F1 can be moved and positioned in an open position for operation of machine 100 with bag 114 attached. In this mode, cover flap F1 does not cover opening 118 and is positioned above and can rest upon the outside of bag 114 to allow discharge of cut grass through opening 118 into bag 114.

Machine 100 further includes a clearing flap F2 for moving in a clearing motion to at least partially clear or move loose cut grass LG supported on lower surface 122 of chute 116 into bag 114. This clearing function is described in further detail below. Clearing flap F2, like cover flap F1, is preferably pivotally attached to housing 106 via rod 126. As shown in FIGS. 1 and 2, clearing flap F2 is positioned in its open position at least partially within a recess 128 (FIGS. 3 and 4) defined by upper surface 120 of chute 116. During normal operation of machine 100 to cut grass, clearing flap F2 is in its open position and does not interfere with operation of blade 104 or discharge of cut grass into bag 114. Clearing flap F2 can be biased in its open position by a spring mechanism. Alternatively, clearing flap F2 can be maintained in its open position by another suitable mechanism known to those of skill in the art.

Cover flap F1 and clearing flap F2 each include one or more attachment ends for connecting to and pivoting about an axis shown as rod 126. Rod 126 preferably extends the width of exit opening 118 and can be a suitable metal rod or other suitable rigid member for forming an axis as can be appreciated by those of skill in the art. Each of the attachment ends can form one or more slots or holes for placement of rod 126 therethrough. The attachment ends of cover flap F1 and clearing flap F2 preferably both are attached to rod 126 so that both cover flap F1 and clearing flap F2 can be moved to pivot about rod 126. It is envisioned though that cover flap F1 and clearing flap F2 could be attached to separate rods or other structures on machine 100 as long as cover flap F1 can be used to actuate clearing flap F2 as described herein.

As shown in FIGS. 1 and 2, cover flap F1 has a full range of motion between its closed position and its initial open position rotating about rod 126 without causing movement of clearing flap F2. At least a portion of an attachment end of cover flap F1 forms a structure such as a ledge which contacts or engages at least a portion of an attachment end of clearing flap F2 that forms a structure such as a ledge as shown in FIG. 2. When cover flap F1 is lifted past its initial open position, this contact between cover flap F1 and clearing flap F2 causes clearing flap F2 to rotatably move about rod 126 where clearing flap F2 moves away from recess 128 in a clearing motion through chute 116 to at least partially move or clear loose cut grass LG from discharge chute 116 into bag 114.

Referring specifically to FIG. 3, cover flap F1 engages clearing flap F2 to clear at least a portion of loose cut grass LG from lower surface 122 of chute 116. An operator can therefore manually move cover flap F1 in an upward direction to move clearing flap F2 while bag 114 is in place. This motion of cover flap F1 is typically necessary anyway as an initial step for removing bag 114. FIG. 4 shows cover flap F1 having been fully lifted past its initial open position to move clearing flap F2 for clearing the remaining portion of cut grass LG into bag 114. After cover flap F1 has been fully lifted, an operator can then remove bag 114 for emptying.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A grass mowing machine comprising:
   (a) a housing;
   (b) an engine attached to the housing;
   (c) at least one rotatable blade operatively connected to the engine and positioned at least partially within the housing for cutting grass;
   (d) a discharge chute defined by the housing for discharge of cut grass through the discharge chute and out of an exit end defining an exit opening;
   (e) a cover flap attached at an attachment end of the cover flap to the discharge chute exit end, the cover flap being movable from a closed position wherein the discharge chute exit opening is covered by the cover flap, to an open position wherein the discharge chute exit opening is uncovered by the cover flap; and
   (f) a clearing flap extending within the discharge chute, the clearing flap movably attached at an attachment end of the clearing flap to the discharge chute exit end at least proximate the attachment end of cover flap, the cover flap being rotatable in its open position wherein the attachment end of the cover flap contacts the attachment end of the clearing flap forcing the clearing flap to swing at least partially through a portion of the discharge chute.

2. A grass mowing machine comprising:
   (a) a housing;
   (b) at least one rotatable blade positioned at least partially within the housing for cutting grass;
   (c) a discharge chute for discharge of cut grass, the discharge chute defining an exit opening;
   (d) a cover flap attached to the grass mowing machine and being movable from a closed position covering the discharge chute exit opening to an open position wherein the discharge chute exit opening is uncovered by the cover flap;
   (e) a movable clearing flap attached to the grass mowing machine for moving in a clearing motion through at least a portion of the discharge chute to at least partially clear cut grass from the discharge chute, the clearing flap and the cover flap being operative whereby the cover flap can be moved in its open position to cause the clearing flap to move in its clearing motion; and
   (f) wherein the cover flap and the clearing flap are attached to the grass mowing machine for rotation about a common axis.

3. A grass mowing machine comprising:
   (a) a housing;
   (b) at least one rotatable blade positioned at least partially within the housing for cutting grass;
   (c) a discharge chute for discharge of cut grass, the discharge chute defining an exit opening;
   (d) a cover flap attached to the grass mowing machine and being movable from a closed position covering the discharge chute exit opening to an open position wherein the discharge chute exit opening is uncovered by the cover flap;
   (e) a movable clearing flap attached to the grass mowing machine for moving in a clearing motion through at least a portion of the discharge chute to at least partially clear cut grass from the discharge chute, the clearing flap and the cover flap being operative whereby the cover flap can be moved in its open position to cause the clearing flap to move in its clearing motion; and
   (f) wherein the cover flap and the clearing flap are attached to the grass mowing machine for rotation about a common axis and wherein the cover flap and the clearing flap are attached to an upper portion of the discharge chute.

4. A grass mowing machine comprising:
   (a) a housing;
   (b) at least one rotatable blade positioned at least partially within the housing for cutting grass;
   (c) a discharge chute for discharge of cut grass, the discharge chute defining an exit opening;
   (d) a cover flap attached to the grass mowing machine and being movable from a closed position covering the discharge chute exit opening to an open position wherein the discharge chute exit opening is uncovered by the cover flap;
   (e) a movable clearing flap attached to the grass mowing machine for moving in a clearing motion through at least a portion of the discharge chute to at least partially clear cut grass from the discharge chute, the clearing flap and the cover flap being operative whereby the cover flap can be moved in its open position to cause the clearing flap to move in its clearing motion;
   (f) wherein the cover flap and the clearing flap are attached to the grass mowing machine for rotation about a common axis; and
   (g) wherein the cover flap defines a portion which contacts at least a portion of the clearing flap and forces the clearing flap to move in its clearing motion when the cover flap is in its open position and is moved about the axis in a direction away from the closed position of the cover flap.

5. A grass mowing machine comprising:
   (a) a housing;
   (b) at least one rotatable blade positioned at least partially within the housing for cutting grass;
   (c) a discharge chute for discharge of cut grass, the discharge chute defining an exit opening;
   (d) a removable grass collector attached to the grass mowing machine for collecting cut grass discharged from the discharge chute;
   (e) a cover flap attached to the grass mowing machine and being movable from a closed position for covering the discharge chute exit opening when the grass collector is unattached to an open position when the grass collector is attached and wherein the discharge chute exit opening is covered by the grass collector;
   (f) a clearing flap attached to the grass mowing machine for moving in a clearing motion through at least a portion of the discharge chute to push cut grass from the discharge chute and into the grass collector, the clearing flap and the cover flap being operative whereby the cover flap can be moved in its open position to cause the clearing flap to move in its clearing position; and
   (g) wherein the cover flap and the clearing flap are attached to the grass mowing machine for rotation about a common axis.

\* \* \* \* \*